(12) United States Patent
Fujita

(10) Patent No.: US 8,380,627 B2
(45) Date of Patent: Feb. 19, 2013

(54) MONEY PROCESSING SYSTEM AND MONEY PROCESSING METHOD

(75) Inventor: Yoshitada Fujita, Hyogo (JP)

(73) Assignee: Glory Ltd., Himeji-Shi, Hyogo (JP)

( * ) Notice: Subject to any disclaimer, the term of this patent is extended or adjusted under 35 U.S.C. 154(b) by 0 days.

(21) Appl. No.: 13/203,491

(22) PCT Filed: Feb. 26, 2010

(86) PCT No.: PCT/JP2010/053147
§ 371 (c)(1),
(2), (4) Date: Aug. 26, 2011

(87) PCT Pub. No.: WO2010/098462
PCT Pub. Date: Sep. 2, 2010

(65) Prior Publication Data
US 2011/0307379 A1    Dec. 15, 2011

(30) Foreign Application Priority Data
Feb. 27, 2009 (JP) ................................. 2009-047292

(51) Int. Cl.
*G06Q 20/10* (2012.01)
(52) U.S. Cl. ............................... 705/42; 705/43; 705/44
(58) Field of Classification Search ............... 705/42–44
See application file for complete search history.

(56) References Cited

U.S. PATENT DOCUMENTS

| | | | |
|---|---|---|---|
| 2005/0160204 A1* | 7/2005 | Wagner | 710/33 |
| 2007/0019068 A1 | 1/2007 | Arseneau et al. | |
| 2007/0088952 A1* | 4/2007 | Hewitt et al. | 713/171 |

FOREIGN PATENT DOCUMENTS

| | | |
|---|---|---|
| JP | 2000-339522 | 12/2000 |
| JP | 2003-345583 | 12/2003 |
| JP | 2004-341863 | 12/2004 |
| JP | 2008-310552 | 12/2008 |

* cited by examiner

*Primary Examiner* — Jagdish Patel
(74) *Attorney, Agent, or Firm* — Renner, Kenner, Greive, Bobak, Taylor & Weber

(57) ABSTRACT

A money processing system includes a terminal device that stores therein as user information, a terminal user identifier for identifying a user and a code used for confirming the user for security reasons entered by the user, judges whether the received user information matches the stored user information when the user information that is entered at a money handling device is received through a port used for data communication with the money handling device, and establishes a connection with the money handling device from which the user information was received via the port if the pieces of the user information match, and the money handling device for entering the user information.

5 Claims, 10 Drawing Sheets

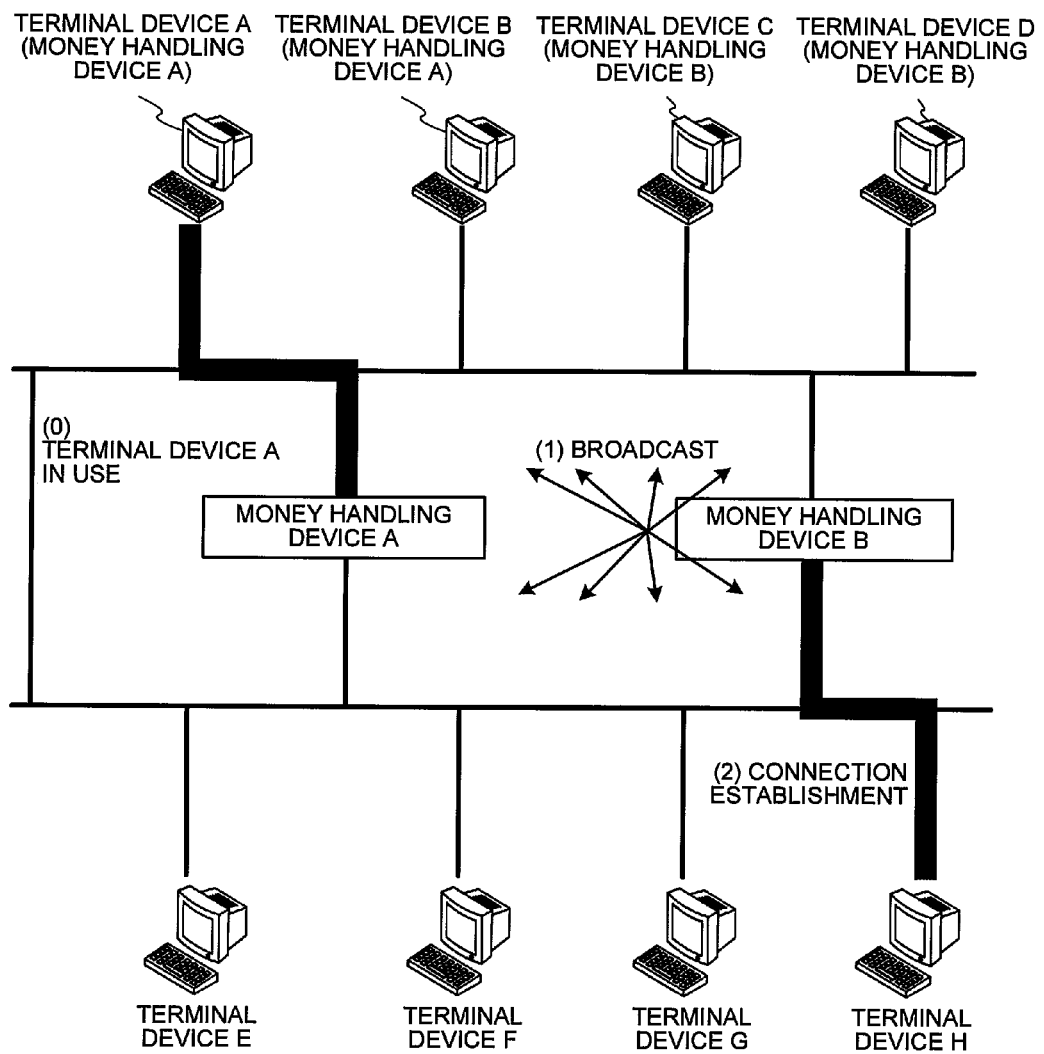

MONEY PROCESSING SYSTEM AND MONEY PROCESSING METHOD

TECHNICAL FIELD

The present invention relates to a money processing system that includes a terminal device for entering money deposit and dispensing information and a money handling device that receives or dispenses money based on the deposit/dispensing information obtained from the terminal device, and a money processing method. The present invention particularly relates to a money processing system and a money processing method whereby, if a money handling device is idle and available for use, a bank employee can access the idle money handling device from any available terminal device when accepting a deposit into or a withdrawal from the customer's account.

BACKGROUND ART

In financial institutions, such as a bank, when accepting a deposit or withdrawal request from a customer, a bank employee enters an amount of money, the customer's account number, the customer's name, etc., using a terminal device installed at a teller window, etc.

Such deposit/dispensing information entered by the bank employee is sent to a host device that manages customer information, deposit/dispensing information, etc. A money handling device installed near the terminal device is used to perform the actual deposit or dispensing of the money based on the deposit/dispensing information entered into the terminal device.

In a system that performs conventional money processing as described above, one money handling device among a plurality of money handling devices is set beforehand as a device that can be accessed from some terminal devices. That is, one money handling device is shared among a plurality of the terminal devices.

For example, in Patent Document 1, a technology is disclosed whereby a priority order is set to a plurality of money handling devices that can be accessed from a terminal device, and the terminal device seeks an available money handling device in descending order of priority.

Even if one money handling device set for a terminal device is being operated from other terminal device, the terminal device can access the other money handling device that is available for use and has been given a lower priority order for the terminal device.

CONVENTIONAL ART DOCUMENTS

Patent Documents

[Patent Document 1] Japanese Patent Application Laid-open No. 2000-339522

DISCLOSURE OF INVENTION

Problem to be Solved by the Invention

However, in the system that performs the conventional money processing as described above, the money handling devices that are not set for a terminal device cannot be accessed from the terminal device.

For example, as disclosed in Patent Document 1, even if a priority order is set to a plurality of the money handling devices, money handling device to which a priority order is not set beforehand cannot be used. For example, even when there is a money handling device available for use, it cannot be used because it has not been set for the terminal device.

Thus, it is a major challenge to realize a money handling device system or a money processing method that allows a bank employee to access an idle money handling device from any terminal device when accepting the deposit or withdrawal request from a customer.

In view of the above discussion, it is an object of the present invention to provide a money processing system and a money processing method whereby, if a money handling device is idle and available for immediate use, a bank employee can access the idle money handling device from any terminal device when accepting a deposit or withdrawal request from a customer.

Means for Solving the Problem

To solve the above problems and to achieve the above objects, a money processing system according to an aspect of the present invention includes a terminal device for deposit/dispensing information for depositing or dispensing money; and a money handling device that receives or dispenses money based on the deposit/dispensing information entered at the terminal device. The terminal device includes a user information storage unit that stores therein, as user information, a terminal user identifier for identifying a user and a code used for confirming the user for security reasons entered by the user; a match judging unit that judges, when the user information entered at the money handling device is received through a port used for data exchange with the money handling device, whether the received user information matches the user information stored in the user information storage unit; and a connection establishing unit that establishes a connection with the money handling device from which the user information was received via the port if the match judging unit judges that the pieces of the user information match. The money handling device includes a user information input unit for entering the user information.

According to another aspect of the invention, in the money processing system, the terminal device further includes an opening unit that opens the port when a command for deposit or dispensing of money is issued by the user, and the money handling device further includes a transmitting unit that transmits the user information entered via the user information input unit to all terminal devices.

According to another aspect of the invention, in the money processing system, the terminal device further includes a terminal-user authentication unit that authenticates whether the user is an authorized user based on the user information stored in the user information storage unit, and the money handling device further includes a device-user authentication unit that authenticates whether the user is an authorized user based on the user information entered via the user information input unit.

According to another aspect of the invention, in the money processing system, the terminal device further includes a closing unit that closes the port opened by the opening unit when a notification indicating that deposit or dispensing of money is completed is received from the money handling device that is connected to the terminal device by the connection establishing unit.

To solve the above problems and to achieve the above objects, a money processing system according to an aspect of the present invention includes a terminal device for entering deposit/dispensing information for depositing or dispensing money; and a money handling device that receives or dispenses money based on the deposit/dispensing information entered at the terminal device. The terminal device includes a deposit and dispensing command issuing unit that is used by a user to issue a command for depositing or dispensing of money. A relay device, that relays communication between the terminal device and the money handling device, includes a user information storage unit that receives from the terminal device user information that includes a terminal user identifier for identifying the user and a code used for confirming the user for security reasons entered at the terminal device by the user, and stores therein the received user information; a terminal connection establishing unit that establishes a connection with the terminal device if the user information stored in the user information storage unit is authenticated to be that of an authorized user; a match judging unit that judges, when the user information that is entered into the money handling device is received, whether the received user information matches the user information stored in the user information storage unit; and a connection establishing unit that establishes a connection with the money handling device and a connection between the terminal device and the money handling device if the match judging unit judges that the pieces of the user information match. The money handling device includes a user information input unit for entering the user information.

According to another aspect of the present invention, a money processing method, in which a terminal device for entering deposit/dispensing information for depositing or dispensing money, and a money handling device for receiving and dispensing money based on the deposit/dispensing information obtained from the terminal device are used, includes storing in the terminal device as user information a terminal user identifier for identifying a user and a code used for confirming the user for security reasons entered by the user; judging by the terminal device, when the user information entered at the money handling device is received through a port used for data communication with the money handling device, whether the received user information matches the user information stored at the storing; establishing by the terminal device a connection with the money handling device from which the user information was received via the port if the pieces of the user information are judged to match at the judging; and entering the user information by the money handling device.

Advantages of the Invention

According to an aspect of the present invention, a terminal device stores therein, as user information, a terminal user identifier for identifying a user and a code used for confirming the user for security reasons entered by the user, judges whether the received user information matches the stored user information when the user information that was entered into a money handling device is received through a port used for data exchange with the money handling device, and establishes a connection with the money handling device wherefrom the user information received through the port is transmitted if the pieces of the user information match, and the money handling device is used for entering the user information. Therefore, a bank employee can use the idle money handling device from any terminal device, if a money handling device is available for use, when accepting a deposit or withdrawal request from a customer.

According to another aspect of the present invention, the terminal device opens the port when a command for depositing or dispensing of money is issued by the user, and the money handling device transmits the entered user information to all terminal devices. Therefore, the idle money handling device can be used even if the money handling device that can be accessed has not been set beforehand for the terminal.

According to another aspect of the present invention, the terminal device authenticates whether the user is an authorized user based on the stored user information, and the money handling device authenticates whether the user is an authorized user based on the entered user information. Therefore, safety can be ensured when performing deposit or dispensing of money.

According to another aspect of the present invention, the terminal device closes the opened port when a notification indicating that deposit or dispensing of money is completed is received from the money handling device that is connected to the terminal device. Therefore, safety can be ensured.

According to another aspect of the present invention, the terminal device is used by the user to issue the command for depositing or dispensing of money, a relay device that relays communication between the terminal device and the money handling device receives from the terminal device the user information that includes the terminal user identifier for identifying the user, and the code used for confirming the user for security reasons entered into the terminal device by the user, and stores therein the received user information, establishes a connection with the terminal device if the stored user information is authenticated to be that of an authorized user, judges whether the received user information matches the stored user information when the user information that was entered into the money handling device is received, and establishes a connection with the money handling device and a connection between the terminal device and the money handling device if the pieces of the user information match, and the money handling device is used for entering the user information. Therefore, a load on a communication line can be greatly reduced and the idle money handling device can be used from any terminal device.

BRIEF DESCRIPTION OF DRAWINGS

FIG. 10 is a schematic diagram of a money processing system according to another modification.

BEST MODE(S) FOR CARRYING OUT THE INVENTION

Exemplary embodiments of a money processing system and a money processing method according to the present invention are explained below in detail with reference to the accompanying drawings. A terminal device and a money handling device explained in the following embodiments are installed at a teller window of a bank, etc. However, the money processing system and the money processing method according to the present invention can also be employed in financial institutions other than banks.

Embodiment

Figure 1A:
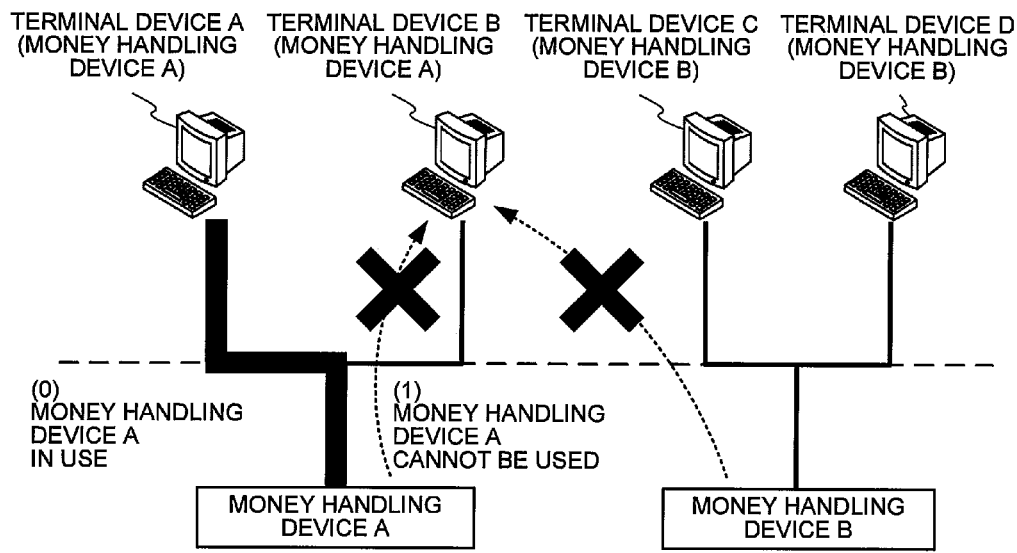
FIGS. 1A and 1B are drawings illustrating an overview of a money processing system according to an embodiment of the present invention.
Figure 1B:
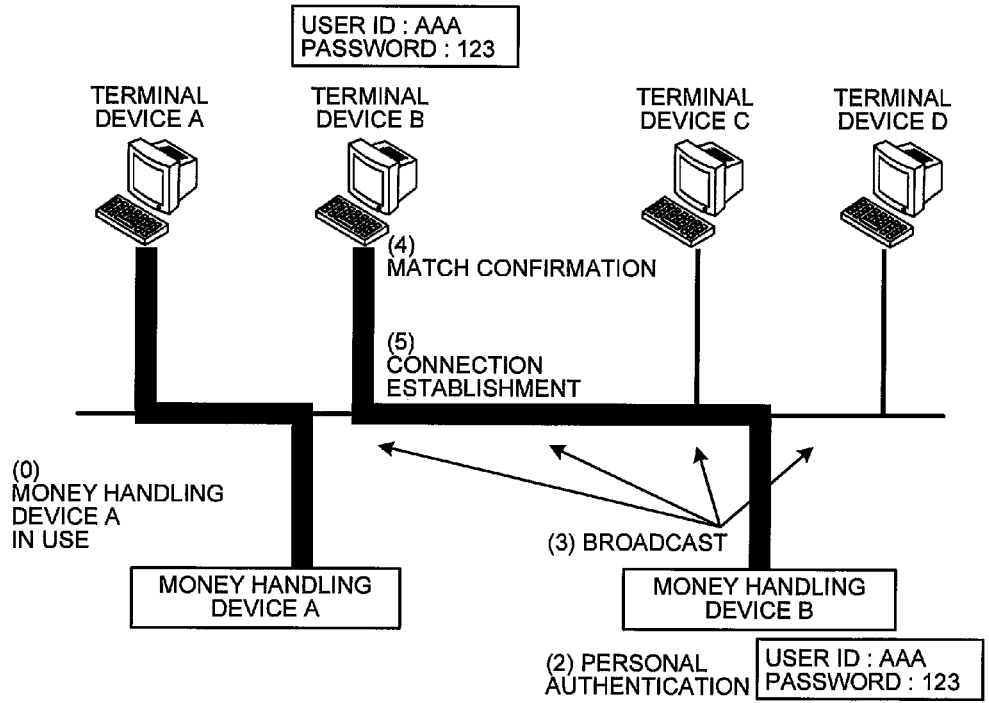

An overview of the money processing system according to the present embodiment is explained with reference to FIGS. 1A and 1B. FIGS. 1A and 1B are drawings illustrating an overview of the money processing system according to the present embodiment. In the money processing system according to the present embodiment, a bank employee (hereinafter, "employee") can access an idle money handling device, that is available for use, from any terminal device when accepting a deposit or withdrawal request from a customer.

A conventional money processing system includes a plurality of terminal devices and a plurality of money handling devices in a bank, as shown in FIG. 1A, and a host device. Money handling devices that can be accessed from each of the terminal devices are set beforehand. One money handling device is shared and can be used by a plurality of the terminal devices.

For example, terminal devices A, terminal device B and money handling device A are logically connected by setting the money handling device can be accessed from the terminal devices A and B. Similarly, terminal devices C, terminal D and money handling device B are logically connected by setting the money handling device can be accessed from the terminal devices C and D.

Connection between the terminal devices and the money handling devices can be achieved with a communication line, such as LAN (Local Area Network). Dashed lines in the drawing represent communication lines that are not logically connected. In this embodiment, a situation in which a certain employee is using the money handling device A from the terminal device A (see (0) of FIG. 1A) is explained.

If another employee tries to access the money handling device A from the terminal device B for processing a deposit or withdrawal request from a customer, that employee cannot access the money handling device A (see (1) of FIG. 1A) because it has already being accessed from the terminal device A.

Even if the money handling device B is idle, the money handling device B cannot be accessed from the terminal device B because the money handling device B has not been set for the terminal device B.

In the money processing system according to the present embodiment, as shown in FIG. 1B, although a device configuration is similar to that described above, all the terminal devices and the money handling devices are interconnected via a communication line, such as LAN.

In the present embodiment, the money handling device, that can be accessed from the terminal device, does not need to be set beforehand. During the money handling device A is being accessed by an employee from the terminal device A (see (0) of FIG. 1B), the money handling device A cannot be accessed from other terminal devices.

When another employee processes a deposit or withdrawal request from a customer, the employee, at first, enters a user identifier (hereinafter, "user ID") for identifying a user of the system and a code (hereinafter, "password") used for confirming the user for security reasons into the terminal device B.

Based on the user ID and the password, the terminal device B performs confirmation that the employee has the authority to use the system as well as confirmation of the individual identity (hereinafter "personal authentication").

After completing the personal authentication, a port of the terminal device B used for data communication with the money handling devices is opened (see (1) of FIG. 1B).

The employee authenticated by the personal authentication on the terminal device B thereafter enters deposit/dispensing information, such as amount of money and a customer's account number, and goes to a location of the available money handling device B for processing a deposit or dispensing of money.

In particular, with regard to dispensing process, to prevent another employee from taking, intentionally or by mistake, the money being dispensed by the money handling device B, personal authentication that requires entering the user ID and the password is also performed at the money handling device B (see (2) of FIG. 1B).

After personal authentication is performed by the money handling device B based on the entered user ID and the password, the user ID and the password entered at the money handling device B are transmitted simultaneously to all the terminal devices that are connected (hereinafter, "broadcast") (see (3) of FIG. 1B).

Upon broadcasting, the user ID and the password received from the money handling device B and the user ID and the password entered into the terminal device B for the personal authentication are respectively compared at the terminal device B (see (4) of FIG. 1B) to confirm whether they match or not.

If the result of the comparison of user IDs and the passwords made at the terminal device B show that they match, a connection is established between the terminal device B and the money handling device B (see (5) of FIG. 1B), and it enables a two-way communication of data, such as the deposit/dispensing information and a result of money processing, between terminal device B and the money handling device B.

As described above, in the money processing system according to the present embodiment, if a money handling device is idle and available for use, the employee can access the idle money handling device from any terminal device when accepting a deposit or withdrawal request from a customer.

Figure 2:
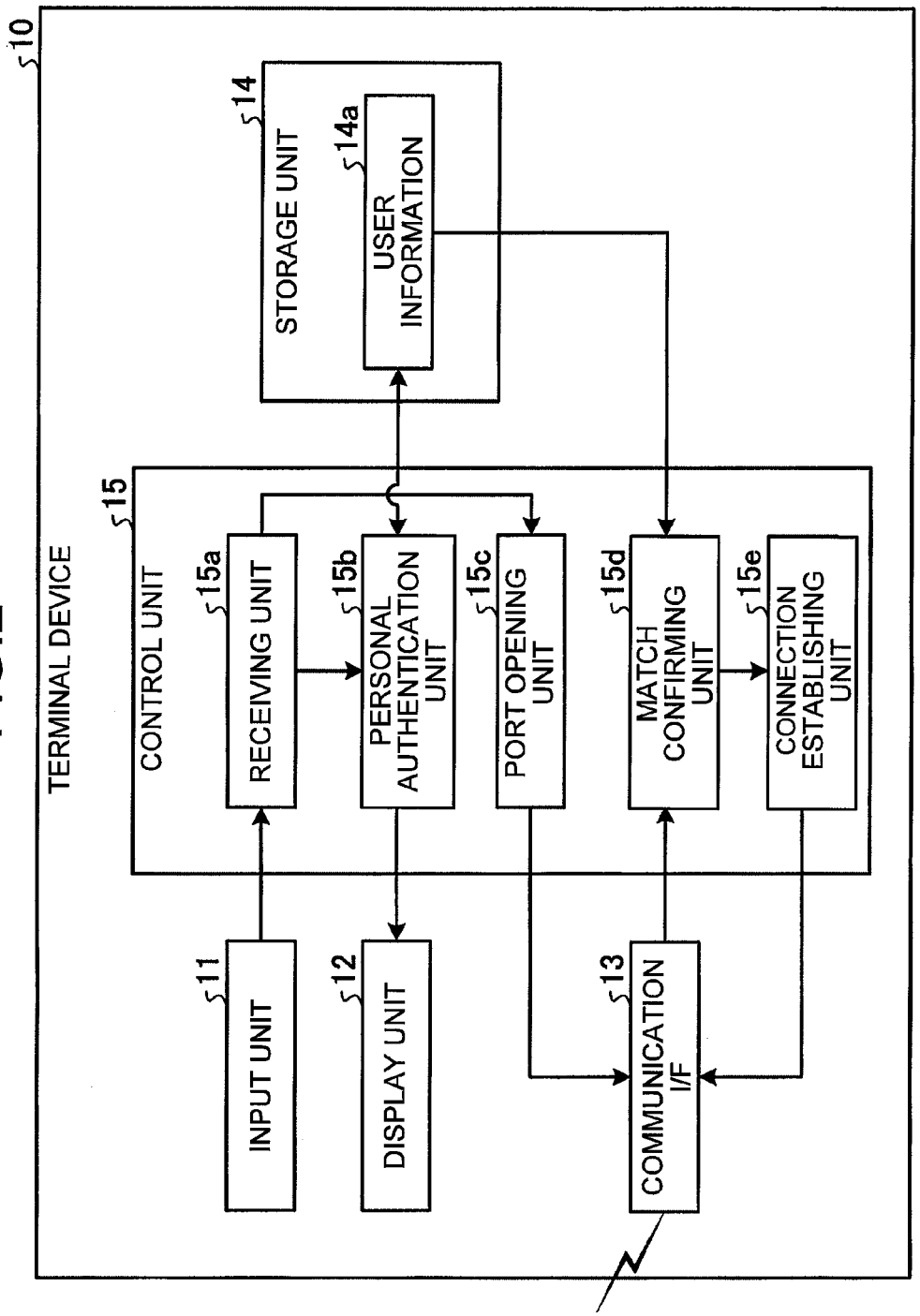
FIG. 2 is a block diagram of a terminal device that constitutes the money processing system.

A structure of a terminal device 10 that constitutes the money processing system according to the present embodiment is explained with reference to FIG. 2. FIG. 2 is a block diagram of the terminal device 10 that constitutes the money processing system.

As shown in FIG. 2, the terminal device 10 includes an input unit 11, a display unit 12, a communication I/F 13, a storage unit 14, and a control unit 15. The control unit 15 further includes a receiving unit 15a, a personal authentication unit 15b, a port opening unit 15c, a match confirming unit 15d, and a connection establishing unit 15e. The storage unit 14 stores therein user information 14a. In FIG. 2, only those constituent elements that are required for explaining features of the terminal device 10 are shown.

The input unit 11 is an input device, such as a keyboard and a mouse. The input unit 11 is used by the employee to enter the user ID and the password for the purpose of personal authentication. The input unit 11 is also used to enter the money amount, the customer's account number, and customer's name, etc., when accepting a deposit or withdrawal request from a customer.

The display unit 12 is a display device, such as a liquid crystal display. The display unit 12 displays an input screen for personal authentication, a personal authentication result, a deposit/dispensing information input screen, etc. For example, if the personal authentication was successful, the display unit 12 displays a message on the screen to indicate that the personal authentication information is correct, and a menu for selecting a deposit or withdrawal process.

The communication I/F (interface) 13 is a communication device, such as a LAN (Local Area Network) board. The communication I/F 13 is used to perform the data communication between the terminal device 10 and the money handling device 20.

The storage unit 14 is a storage device such as a nonvolatile memory and a hard disk drive. The storage unit 14 stores therein the user information 14a. The user information 14a includes the user ID and the password entered by the employee using the input unit 11 for the purpose of personal authentication.

The receiving unit 15a is a processing unit that receives the user ID and the password entered through the input unit 11 and passes them on to the personal authentication unit 15b. The receiving unit 15a also receives commands for execution of various operations entered through the input unit 11 and passes them on to the relevant processing units of the control unit 15.

For example, when an execute command key is operated after the user ID and the password were entered by using a user information input screen displayed on the display unit 12 for personal authentication, the receiving unit 15a passes on the user ID and the password to the personal authentication unit 15b to performing a process for them.

The personal authentication unit 15b is a processing unit that confirms, based on the user ID and the password entered by the employee using the input unit 11, whether the employee has the authority to use the money processing system, and performs a process for confirming the individual identity.

The port opening unit 15c is a processing unit that keeps a port open for the data communication with the money handling device 20 upon being passed on a deposit command or a dispensing command by the receiving unit 15a.

The match confirming unit 15d is a processing unit that confirms whether the user information 14a matches the user information received from the money handling device 20 through the port opened by the port opening unit 15c.

The connection establishing unit 15e is a processing unit that confirms that the data for the terminal device 10, in which the connection establishing unit 15e is provided, has been received if the match confirming unit 15d confirms match of the data, and establishes a connection with the money handling device 20.

Figure 3:
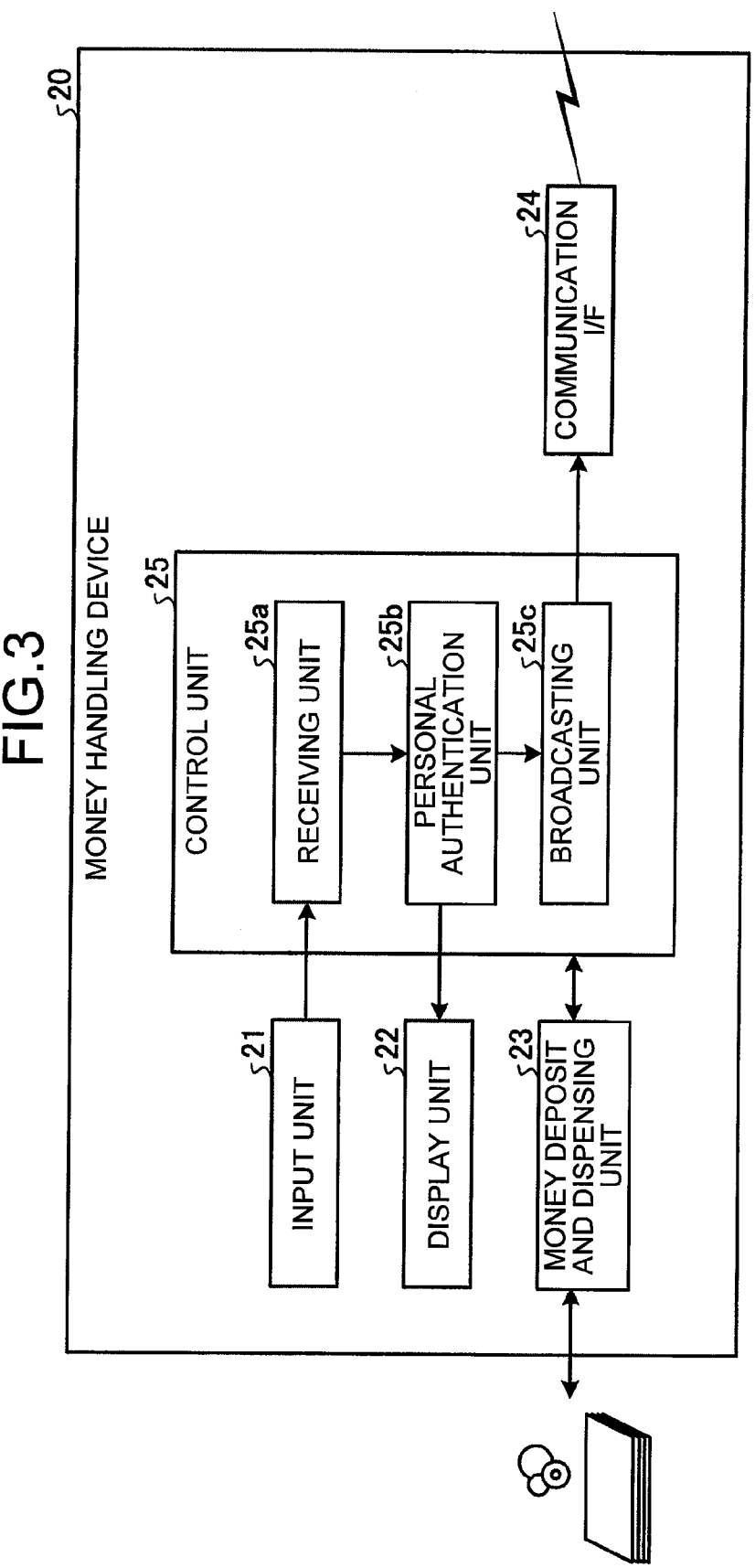
FIG. 3 is a block diagram of a money handling device that constitutes the money processing system.

A structure of the money handling device 20 that constitutes the money processing system according to the present embodiment is explained with reference to FIG. 3. FIG. 3 is a block diagram of the money handling device 20 that constitutes the money processing system.

As shown in FIG. 3, the money handling device 20 includes an input unit 21, a display unit 22, a money depositing and dispensing unit 23, a communication I/F 24, and a control unit 25. The control unit 25 further includes a receiving unit 25a, a personal authentication unit 25b, and a broadcasting unit 25c. In FIG. 3, only those constituent elements that are required for explaining features of the money handling device 20 are shown.

The input unit 21 is an input device, such as a keyboard, a mouse, a touch panel, and a card reader. The input unit 21 is used by the employee for entering the user ID and the password for the purpose of personal authentication, and for entering the commands for various processes.

For example, for executing deposit of banknotes, the employee places the banknotes in an input port for receiving money, and uses the input unit 21 to operate a start deposit command key.

The display unit 22 is a display device, such as a liquid crystal display. The display unit 22 displays the input screen for personal authentication and the personal authentication result. For example, if the personal authentication result indicates fraudulence, the display unit 22 displays a message on the screen to indicate that the personal authentication information is fraudulent, and once again displays the input screen for entering the user ID and the password.

The money depositing and dispensing unit 23 is a processing unit that, when accepting a deposit, receives banknotes and coins, performs an authentication recognition whether the received money is counterfeit, and a counting process, and notifies an authentication recognition result and a count result to the control unit 25. When dispensing money, the money depositing and dispensing unit 23 performs money processing that includes counting the amount of money based on the received command from the control unit 25, and dispensing the counted money to an outlet for dispensing money.

The communication I/F (interface) 24 is a communication device such as a LAN (Local Area Network) board. The communication I/F 24 is used to perform data communication between the money handling device 20 and the terminal device 10.

The control unit 25 issues, based on the deposit/dispensing information received from the terminal device 10, a command to deposit money or to dispense money, and transmits to the terminal device 10 the deposited amount or dispensed amount, and a result of the money processing.

The receiving unit 25a is a processing unit that receives and passes on the user ID and the password entered through the input unit 21 to the personal authentication unit 25b, and receives commands for execution of various operations entered through the input unit 21 and passes them on to the relevant not shown processing units of the control unit 25.

The personal authentication unit 25b is a processing unit that confirms, based on the user ID and the password entered by the employee using the input unit 21, whether the employee has the authority to use the money processing system, and performs a process for confirming the individual identity.

The broadcasting unit 25c is a processing unit that performs a so-called broadcasting process by simultaneously transmitting the user ID and the password entered by using the input unit 21 to all the terminal devices 10 connected via the communication line.

Figure 4:
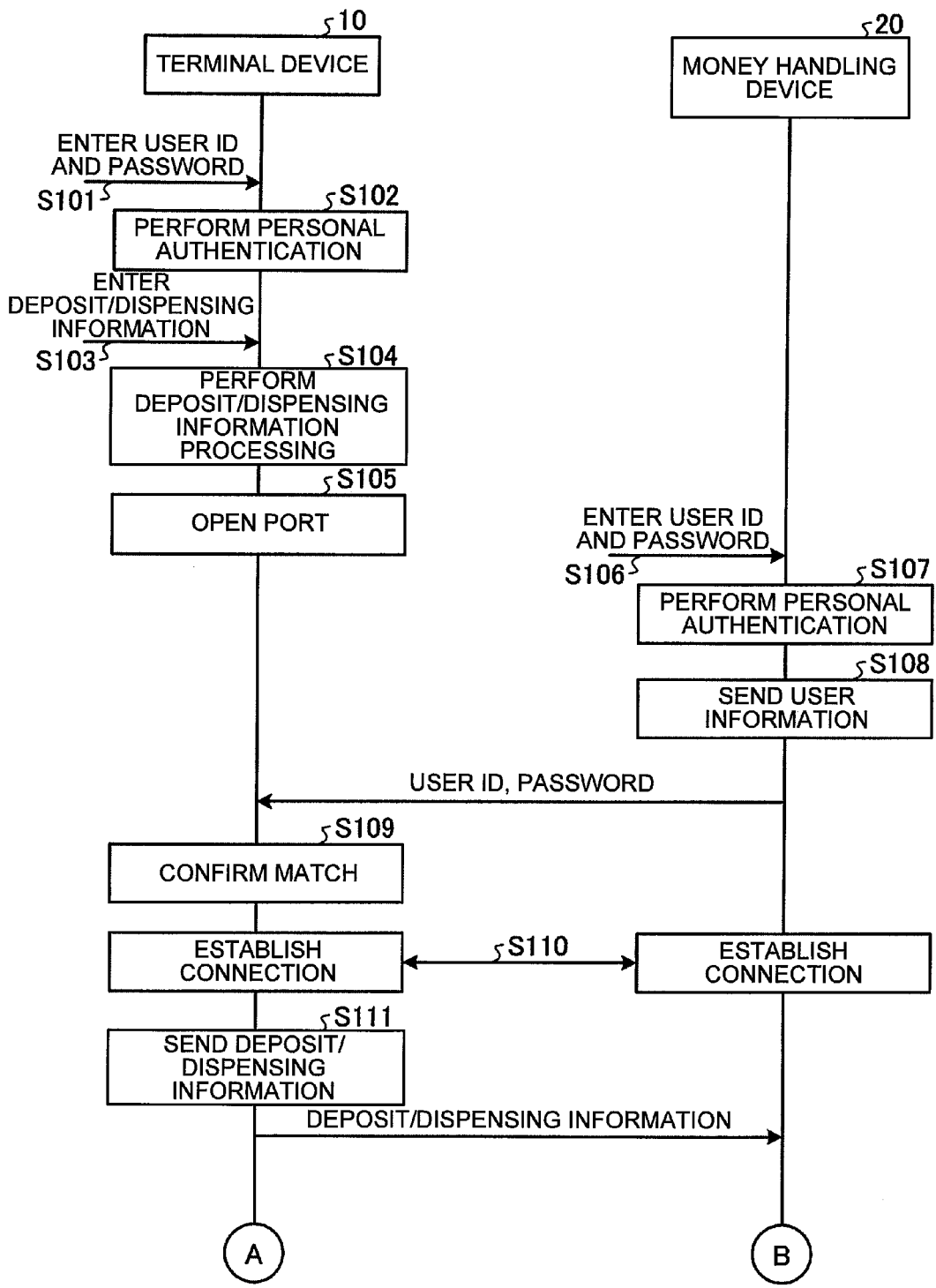
FIG. 4 is a sequence diagram of a money processing procedure according to the present embodiment.
Figure 5:
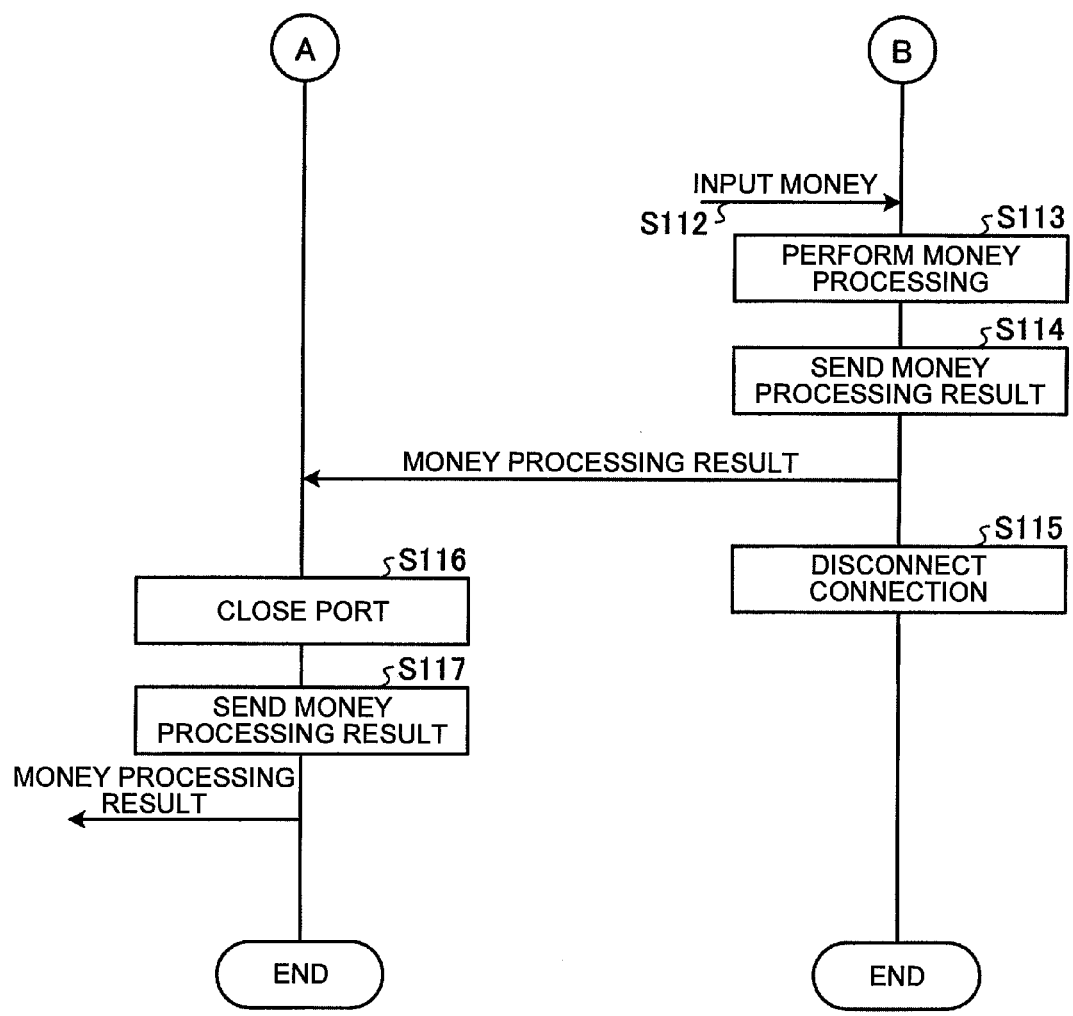
FIG. 5 is another sequence diagram of the money processing procedure according to the present embodiment.

Process procedures performed by the terminal device 10 and the money handling device 20 constituting the money processing system according to the present embodiment are explained below with reference to FIGS. 4 and 5. FIGS. 4 and 5 are sequence diagrams of a money processing procedure according to the present embodiment.

As shown in FIGS. 4 and 5, when accepting the deposit or withdrawal request from a customer, the employee enters the user ID and the password for the purpose of personal authentication into the terminal device 10 where the deposit/dispensing information is to be entered (Step S101). The inputted user ID and the password are stored in the storage unit 14.

Based on the user ID and the password entered by the employee, the terminal device 10 performs personal authentication (Step S102), and if authenticated, the employee enters the deposit/dispensing amount of money along with the deposit/dispensing information, such as the customer's account number and customer's name, into the terminal device 10 (Step S103).

Thereafter, the terminal device 10 transmits the deposit/dispensing information inputted by the employee to a not shown host device that manages the customer information, account information, etc., (Step S104), opens the port (Step S105), and enables communication of data with the money handling device 20.

After deposit/dispensing information processing is completed, the employee goes to a location of the money handling device 20 to process the deposit or dispensing of money, and enters the user ID and the password for the purpose of personal authentication by the money handling device 20 as well (Step S106).

Based on the user ID and the password entered by the employee, the money handling device 20 performs personal authentication (Step S107), and if authenticated, the money handling device 20 broadcasts the inputted user information to the terminal devices 10 (Step S108).

Meanwhile, in the terminal device 10 in which the port has been opened, after confirmation that the user information 14a stored in the storage unit 14 matches the received user information is made (Step S109), if they match, a connection with the money handling device 20 is established (Step S110).

Thereafter, the terminal device 10 transmits the deposit/dispensing information entered by the employee to the money handling device 20 (Step S111), and issues a command to the money handling device 20 to accept the deposit or dispensing of money. The money handling device 20 then initiates the money processing for accepting the deposit or dispensing of money.

An example of a money deposit process procedure is explained below. When the employee puts the deposited money into the money handling device 20 that has received the deposit command from the terminal device 10 (Step S112), the money handling device 20 performs the money processing that includes the authentication recognition and the counting process of the deposited money (Step S113).

The money handling device 20 then transmits to the terminal device 10 the result of the money processing performed for the deposit of the money (Step S114), and because the money handling device 20 is used for depositing and dispensing of cash, from safety point of view, immediately disconnects the connection with the terminal device 10 (Step S115), and ends the process.

Meanwhile, upon receiving the money processing result from the money handling device 20, the terminal device 10 judges that an action sequence of the money processing performed in response to the command for the deposit of the money has been completed, and from safety point of view, closes the port (Step S116).

The terminal device 10 transmits the money processing result received from the money handling device 20 to the not shown host device (Step S117), and ends the process. Based on the received money processing result, the not shown host device coordinates the account information managed by a database, etc., with the funds in the bank.

As explained above, in the present embodiment, the terminal device 10 receives the user information that is entered into the money handling device 20, confirms that the received user information is transmitted to itself if the user information inputted into the terminal device 10 matches the user information received from the money handling device 20, and establishes a connection with the money handling device 20 to perform the money processing. Consequently, if a money handling device is available for use, the employee can safely use the idle money handling device from any terminal device when accepting the deposit or withdrawal request from a customer.

In the claims of the present invention, a terminal device corresponds to the terminal device 10, a money handling device corresponds to the money handling device 20, a user information storage unit corresponds to the storage unit 14, a match judging unit corresponds to the match confirming unit 15d, a connection establishing unit corresponds to the connection establishing unit 15e, a user information input unit corresponds to the input unit 21, an opening unit corresponds to the port opening unit 15c, a transmitting unit corresponds to the broadcasting unit 25c, a terminal-user authentication unit corresponds to the personal authentication unit 15b, a device-user authentication unit corresponds to the personal authentication unit 25b, and a closing unit corresponds to the control unit 15.

In the embodiment described above, the user information is broadcasted from the money handling device 20 to the terminal devices 10 for confirming whether the user information entered into the money handling device 20 matches the user information entered into any of the terminal devices 10. However, the user information can be sent from the money handling device 20 to each one of the terminal devices 10 at a time (polling method) to confirm if any terminal device 10 has its port open.

Thus, by not broadcasting to all the terminal devices 10, the terminal device 10 with the matching user information can be confirmed without overloading the communication line.

In the embodiment described above, the user ID and the password for personal authentication are entered into the terminal device 10 and the money handling device 20. However, a card reader each can be attached to the terminal devices 10 and the money handling device 20, and the user information can be confirmed at each device by swiping a card that is associated with the user information through the card reader.

Furthermore, safety can be improved by using the card readers, as the risk of someone else stealing the user ID and password of an employee and misusing the system can be avoided.

In the embodiment described above, the port in the terminal device 10 is opened and broadcasting is done by the money handling device 20. As an alternative, a device configuration can be used in which a relay device is provided between the terminal device 10 and the money handling device 20.

Figure 6:
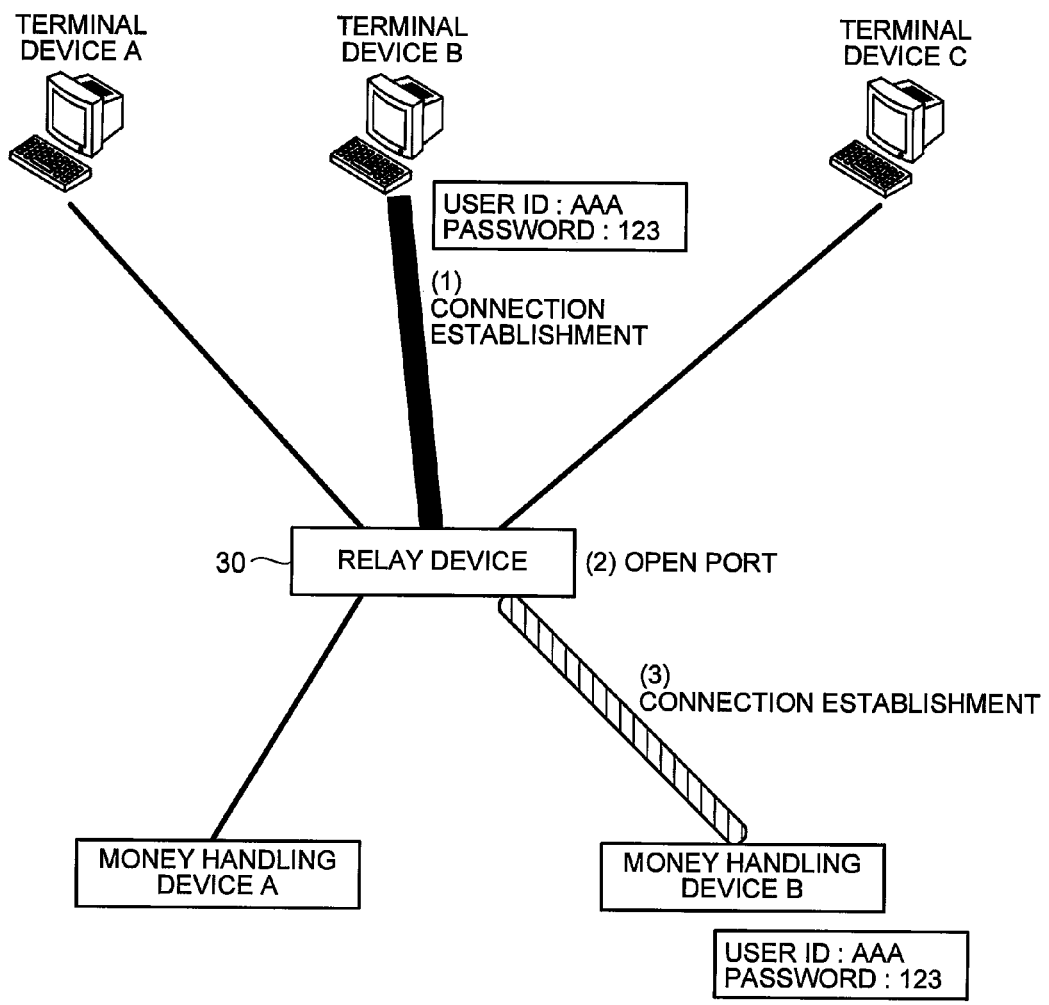
FIG. 6 is a drawing illustrating an overview of a money processing system according to a modification.

A money processing system that includes the relay device is explained below. FIG. 6 is a drawing illustrating an overview of a money processing system according to a modification embodiment. As shown in FIG. 6, the money processing system includes terminal devices, money handling devices, and a relay device 30, and differs from the money processing system shown in FIG. 1B in that the money handling device transmits user information to the relay device 30 instead of broadcasting it to the terminal devices.

Specifically, the relay device 30 shown in FIG. 6 receives the user information entered into a terminal device B, performs personal authentication based on the received user information, and if authenticated, establishes a connection with the terminal device B (see (1) of FIG. 6), and opens a port for communication of data with the money handling device (see (2) of FIG. 6).

Meanwhile, the money handling device B, performs personal authentication based on the entered user information, and thereafter transmits the user information to the relay device 30. The relay device 30 checks whether the user information received from the terminal device B and the user information received from the money handling device B match or not.

If the two pieces of user information match, the relay device 30 establishes a connection with the money handling device B (see (3) of FIG. 6). Consequently, a connection between the terminal device B and the money handling device B is established via relay device 30.

Figure 7:
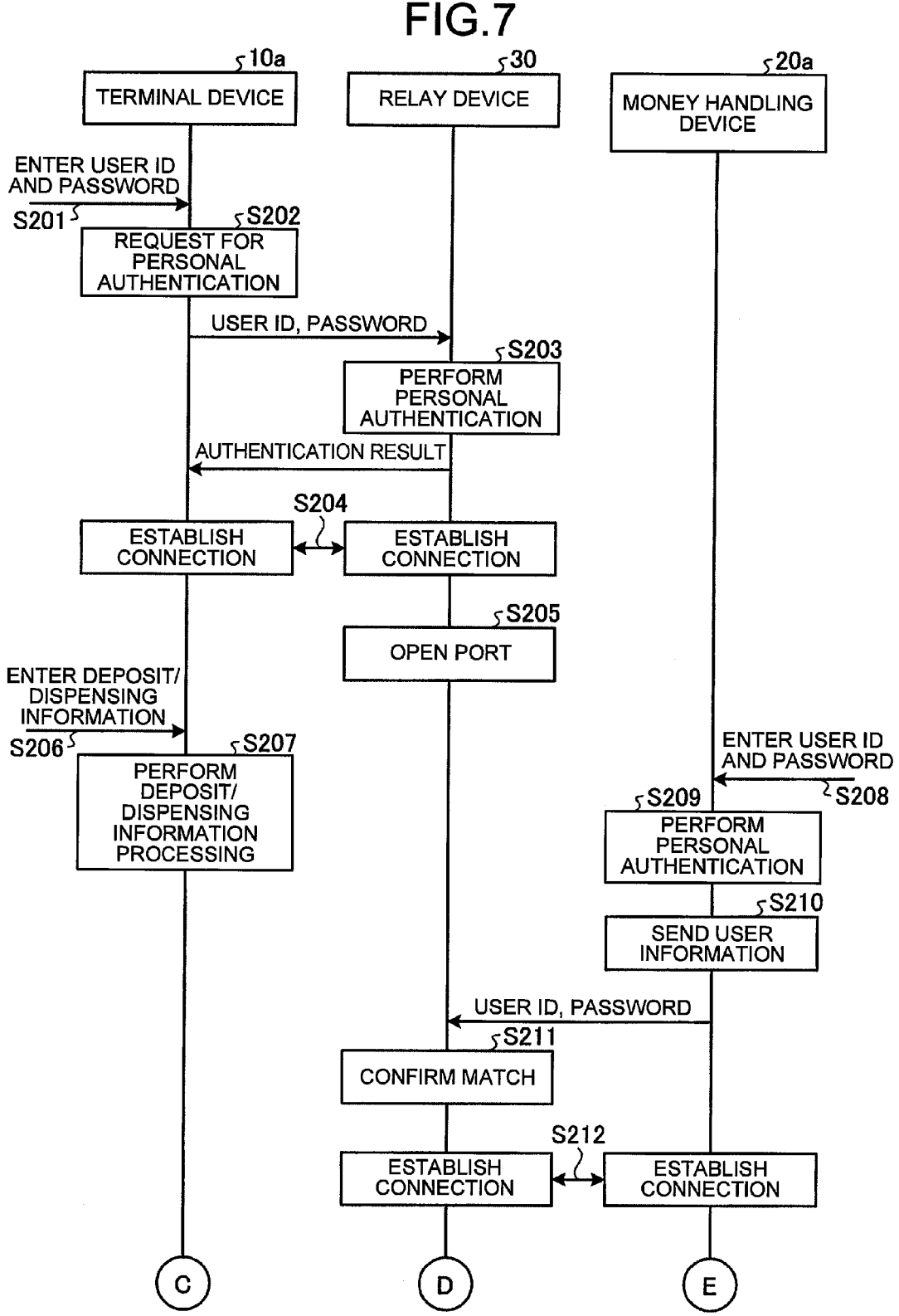
FIG. 7 is a sequence diagram of a money processing procedure according to the modification.
Figure 8:
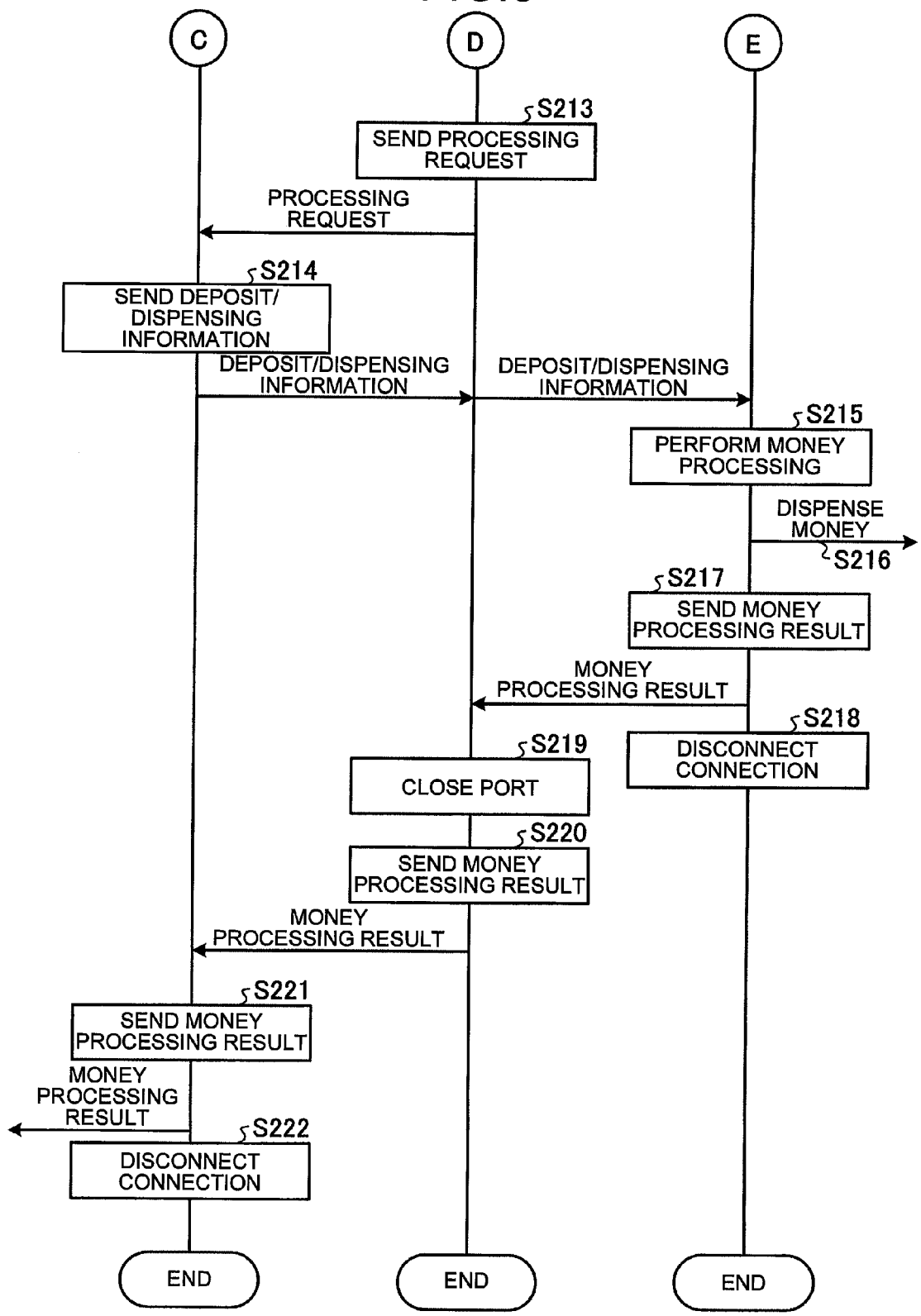
FIG. 8 is another sequence diagram of the money processing procedure according to the modification.

Process procedures performed by a terminal device 10a, a money handling device 20a, and the relay device 30 that constitute the money processing system according to the modification embodiment are described below with reference to FIGS. 7 and 8. FIGS. 7 and 8 are sequence diagrams of a money processing procedure according to the modification.

As shown in FIG. 7, the employee enters the user ID and the password when entering the deposit/dispensing information (Step S201), and the terminal device 10a transmits the deposit/dispensing information to the relay device 30 and requests the relay device 30 to perform personal authentication (Step S202).

The relay device 30 performs the personal authentication based on the received user information (Step S203) and if authenticated, transmits an authentication result to the terminal device 10a, and establishes a connection with the terminal device 10a (Step S204).

The relay device 30 then opens the port (Step S205) so that data can be communicated with the money handling device 20a. Meanwhile, the employee enters the deposit/dispensing information into the terminal device 10a (Step S206), and the terminal device 10a performs processing for the deposit/dispensing information (Step S207).

After the deposit/dispensing information processing is completed, the employee goes to the location of the money handling device 20a, and enters the user ID and the password for the purpose of personal authentication by the money handling device 20a as well (Step S208).

Based on the user ID and the password entered by the employee, the money handling device 20a performs personal authentication (Step S209), and if authenticated, the money handling device 20a transmits the user information to the relay device 30 (Step S210).

Meanwhile, in the relay device 30 in which the port has been opened, after confirmation that the user information received from the terminal device 10a matches the user information received from the money handling device 20a is made (Step S211), a connection is established with the money handling device 20a (Step S212).

The relay device 30 transmits a request for the subsequent process to the terminal device 10a to notify the terminal device 10a that the connection has been established between the terminal device 10a and the money handling device 20 (Step S213).

Thereafter, the terminal device 10a transmits the deposit/dispensing information entered at Step S206 to the money handling device 20a via the relay device 30 (Step S214), thus initiating the money processing for accepting the deposit or dispensing.

An example of a money depositing process procedure is explained below. The money handling device 20a performs the money processing that includes counting, etc., of the money to be dispensed based on the deposit/dispensing information received from the terminal device 10a (Step S215), and dispenses the money (Step S216).

The money handling device 20a then transmits a money processing result of the dispensing of money to the relay device 30 (Step S217), and from safety point of view, immediately disconnects the connection with the relay device 30 (Step S218), and ends the process.

Thereafter, upon receiving the money processing result from the money handling device 20a, the relay device 30 judges that an action sequence of the money processing performed for the dispensing of the money has been completed, and from safety point of view, closes the port (Step S219), transmits the money processing result received from the money handling device 20a to the terminal device 10a (Step S220), and ends a relay process.

Meanwhile, the terminal device 10a transmits the money processing result received from the relay device 30 to a not shown host device (Step S221), disconnects the connection with the relay device 30 (Step S22), and ends the process.

Thus, as explained above, in the modification embodiment, a device configuration is used whereby the relay device 30 is provided between the terminal device 10a and the money handling device 20a, and thus it can be identified as to with which terminal device 10a the relay device 30 has been connected.

Thus, even if there are many terminal devices 10a connected in the system, the money handling device 20a needs to transmit the user information only to the relay device 30. Consequently, the load on the communication line can be greatly reduced.

In the embodiment described above, the employee goes to the location of to the money handling device 20a that is available for use for accepting the deposit or dispensing. However, the relay device 30 can determine the load of each of the money handling devices and identify beforehand the money handling device 20a that is available for use.

Figure 9A:
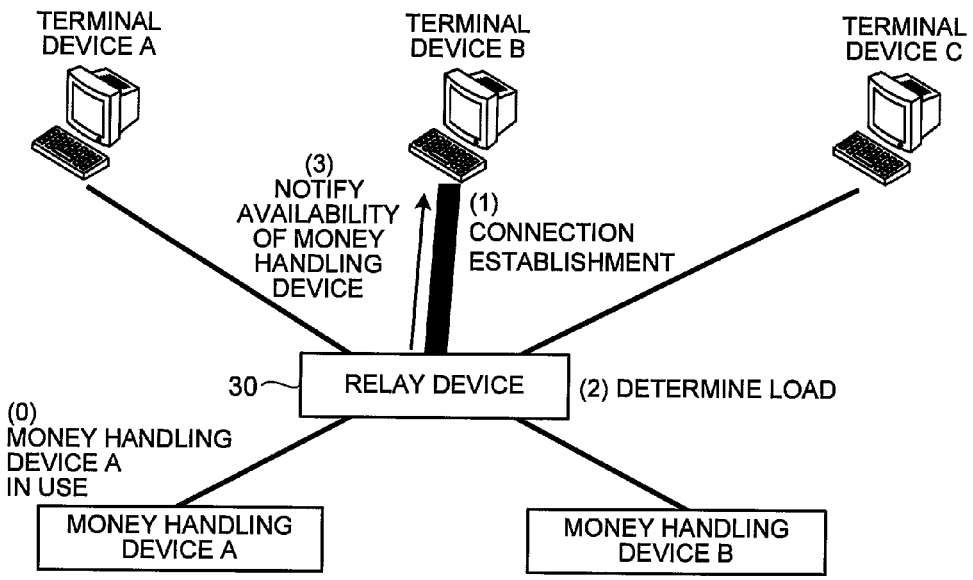
FIGS. 9A and 9B are drawings for explaining a processing action of the money processing system according to the modification.
Figure 9B:
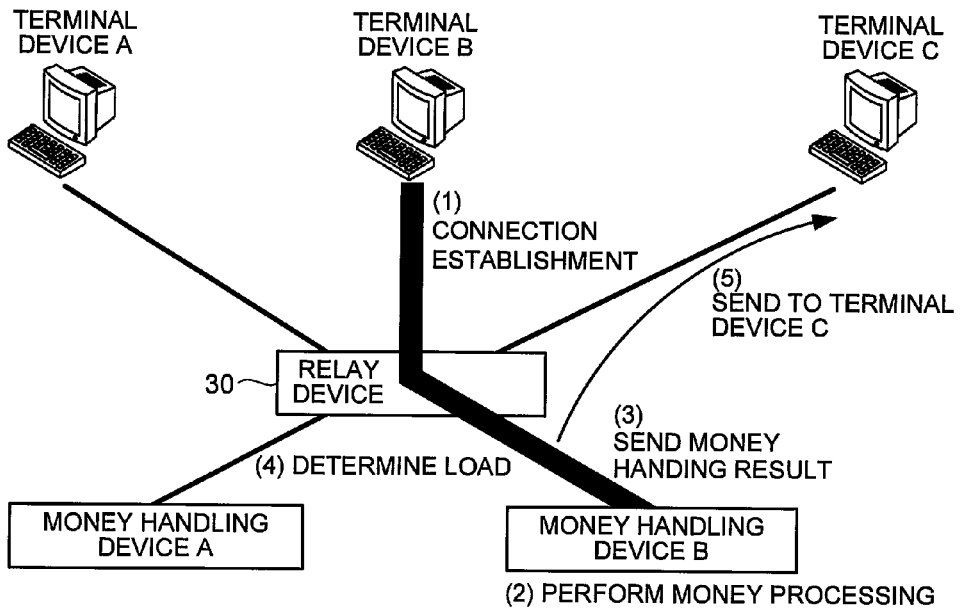

A processing action of the relay device 30 for determining the load of each device is simply explained with reference to FIGS. 9A and 9B. FIGS. 9A and 9B are drawings for explaining the processing action of the money processing system according to another modification embodiment.

The money processing system shown in FIG. 9A has a device configuration that is identical to that of the money processing system shown in FIG. 6. In this example, the money handling device A is being accessed by the terminal device A (see (0) of FIG. 9A).

In this state, after a connection is established between the terminal device B and the relay device 30 (see (1) of FIG. 9A), the relay device 30 determines the load of each of the money handling devices (see (2) of FIG. 9A), and searches the money handling device that is currently idle and available for use.

The relay device 30 then notifies the terminal device B the availability of the money handling device that is currently available for use (see (3) of FIG. 9A). After confirming the availability of the money handling device notified by the relay device 30, the employee goes to the location of the money handling device according to the notification and performs the deposit or dispensing process.

When the relay device 30 notifies the terminal device B the availability of the money handling device, the terminal device B can reserve the money handling device available for use, for example, the money handling device B, and, the relay device 30 can indicate that the money handling device B is being accessed.

By doing so, a potential situation can be avoided where several employees walk up to the same money handling device after looking at the availability notification, and the employee can access the money handling device, that is available for use, efficiently and without hindrance.

In the embodiment described above, the money handling device performs the money processing and transmits the money processing result to the relay device 30, from which the money processing result is transmitted to the terminal device with which the relay device 30 has established a connection. However, this invention is not to be thus limited.

For example, the relay device 30 can determine the load on each of the terminal devices, and transmit the money processing result to the terminal device that has the least load. A specific example is explained with reference to FIG. 9B.

As shown in FIG. 9B, the money handling device B performs the money processing (see (2) of FIG. 9B) after a connection is established between the terminal device B and the relay device 30 (see (1) of FIG. 9B), and transmits the money processing result to the relay device 30 (see (3) of FIG. 9B).

If the terminal device B is already in use for performing another process, the relay device 30 determines that a processing load on a terminal device C is less than terminal B (see (4) of FIG. 9B), and transmits the money processing result to the terminal device C (see (5) of FIG. 9B). By doing so, a processing speed can be improved because the money processing result is transmitted to the host device by the terminal device C that has less load.

The present invention is not be limited to the embodiments described herein but can be implemented in other different forms. For example, the technology according to the embodiments of the present invention can be adapted to coexist with existing operations in use in banks.

An example of the technology according to the present invention, that is adapted to coexist with the existing operations in use in banks, is explained with reference to FIG. 10. FIG. 10 is a schematic diagram of a money processing system according to another modification embodiment.

As shown in the upper part of FIG. 10, an existing bank has a device configuration in which a money handling device that can be used is set beforehand for each of terminal devices A to D, and two terminal devices share one money handling device.

Specifically, the money handling device A is set to be usable by the terminal devices A and B, and the money handling device B is set to be usable by the terminal devices C and D.

As shown in the lower part of FIG. 10, terminal devices E to H have been added to the system, and no money handling device is set as usable by each of the terminal devices E to H. Therefore, when an employee is using the money handling device A from the terminal device A (see (0) of FIG. 10), the money handling device A cannot be accessed from any other terminal device.

If another employee accepts a deposit or withdrawal using the terminal device H, the employee cannot use the money handling device A because it has been already being accessed by the terminal device A.

Therefore, the employee authenticated by the personal authentication on the terminal device H, goes to the location of the money handling device B that is not in use, and enters the user information. The money handling device B then broadcasts the user information entered by the employee to the terminal devices (see (1) of FIG. 10).

The terminal device H performs match confirmation of the user information, establishes a connection with the money handling device B so that the money handling device B can perform money processing. Thus, the money processing system according to the present invention can be introduced into a money processing system currently in use without changing it.

Because the existing money processing system currently in use in a bank need not be replaced and can be used as it is along with the money processing system according to the present invention, the cost of introducing the money processing system according to the present invention can be greatly reduced.

In the embodiments of the present invention, a money handling device that is used in financial institutions, such as a bank, has been described. However, the present invention is not to be thus limited. For example, apart from money, the present invention can also be applied to any paper sheet kind, such as gift certificates, used in department stores, cash voucher shops, etc.

In the embodiments described above, the bank employee enters the deposit/dispensing information when accepting a deposit or withdrawal request from the customer. However, the bank employee can do likewise when replenishing or collecting cash from an ATM (Automatic Teller Machine) or a change machine installed in the bank.

The embodiment described above relates to a money handling device that handles money. However, the present invention can be implemented in other different forms. For example, the present invention can be applied to printers connected to the communication line, such as LAN.

When printing from a terminal device connected to the communication line, the printer is generally set beforehand on the terminal device. The printer follows print queue and prints out the queue data in a chronological order of print commands.

Specifically, the next command for a printout is not executed by the printer unless it has completed the printing process that is underway. There is a risk of leakage of confidential information due to an unauthorized person walking away with the printout intentionally or mistakenly.

Therefore, the present invention can be applied to the printer, because the user has to go to the location of the printer that is outputting the printout, thus eliminating the possibility of any unauthorized person intentionally or mistakenly walking away with the printout. Therefore, the security of the bank or business can be ensured.

INDUSTRIAL APPLICABILITY

The money processing system according to the present invention is useful when the employee is accepting a deposit or withdrawal request from the customer, and is particularly applicable to enable the employee to safely use a money handling device that is available for use from any terminal device.

EXPLANATIONS OF LETTERS OR NUMERALS

10: Terminal device
11: Input unit
12: Display unit
13: Communication I/F
14: Storage unit
14a: User information
15: Control unit
15a: Receiving unit
15b: Personal authentication unit
15c: Port opening unit
15d: Match confirming unit
15e: Connection establishing unit
20: Money handling device
21: Input unit
22: Display unit
23: Money depositing and dispensing unit
24: Communication I/F 25: Control unit
25a: Receiving unit
25b: Personal authentication unit
25c: Broadcasting unit
10a: Terminal device
20a: Money handling device
30: Relay device

The invention claimed is:

1. A money processing system comprising:
a plurality of terminal devices for entering deposit/dispensing information for depositing or dispensing money; and
a plurality of money handling devices that receive or dispense money based on the deposit/dispensing information entered at and when connected to one of the plurality of the terminal devices, wherein each of the plurality of the terminal devices includes:
  a user information storage unit that stores therein user information for identifying a user;
  a match judging unit that judges, when user information entered at the money handling device is received through a port used for data communication with the money handling device, whether the received user information matches the user information stored in the user information storage unit; and
  a connection establishing unit that establishes a connection with the money handling device from which the user information was received if the match judging unit judges that the received user information matches the stored user information;
wherein each of the plurality of the money handling devices receives or dispenses money based on the deposit/dispensing information only when the connection establishing unit establishes the connection between the terminal device and the money handling device.

2. The money processing system according to claim 1, wherein
each of the plurality of the terminal devices further includes an opening unit that opens the port when a command for deposit or dispensing of money is issued by the user, and
each of the plurality of the money handling devices further includes a transmitting unit that transmits the user information entered via a user information input unit to all of the terminal devices.

3. The money processing system according to claim 2, wherein each of the plurality of the terminal devices further includes a closing unit that closes the port opened by the opening unit when a notification indicating that deposit or dispensing of money is completed is received from the money handling device that is connected to the terminal device by the connection establishing unit.

4. A money processing system comprising:
a terminal device for entering deposit/dispensing information for depositing or dispensing money;
a money handling device that when connection is established with the terminal device receives or dispenses money based on the deposit/dispensing information entered at the terminal device; and
a relay device that relays communication between the terminal device and the money handling device includes:
  a user information storage unit that receives from the terminal device user information for identifying a user entered at the terminal device by the user, and stores therein the user information received from the terminal device;
  a terminal connection establishing unit that establishes a connection with the terminal device if the user information stored in the user information storage unit is authenticated to be user information of an authorized user;
  a match judging unit that when user information entered at the money handling device is received, judges whether the received user information matches the user information stored in the user information storage; and
  a connection establishing unit that establishes a connection with the money handling device and a connection between the terminal device and the money handling device if the match judging unit judges that the received user information matches the stored user information,
wherein the money handling device receives or dispenses money based on the deposit/dispensing information only when the connection establishing unit establishes the connection between the terminal device and the money handling device.

5. A money processing method in which a terminal device for entering deposit/dispensing information, and a money handling device for receiving and dispensing money, when connection is established with the terminal device, based on the deposit/dispensing information obtained from the terminal device are used, the money processing method comprising:
storing in the terminal device user information for identifying a user entered by the user;
judging by the terminal device, when the user information entered at the money handling device is received through a port used for data communication with the money handling device, whether the received user information matches the user information stored at the storing;
establishing by the terminal device a connection with the money handling device from which the user information was received if the received user information is judged to match the stored user information at the judging; and
receiving or dispensing money based on the deposit/dispensing information only when the connection between the terminal device and the money handling device is established.

* * * * *